US009455785B2

(12) United States Patent
Boyd et al.

(10) Patent No.: US 9,455,785 B2
(45) Date of Patent: Sep. 27, 2016

(54) UNIFIED NETWORK MANAGEMENT OF HYBRID FIBER COAXIAL (HFC) NETWORK

(71) Applicant: Broadcom Corporation, Irvine, CA (US)

(72) Inventors: Edward Wayne Boyd, Petaluma, CA (US); Ernie Bahm, Buford, GA (US); Joel I. Danzig, Alpharetta, GA (US); Rennie Gardner, Woodstock, GA (US); Lawrence Drew Davis, Johns Creek, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/622,498

(22) Filed: Feb. 13, 2015

(65) Prior Publication Data
US 2015/0180576 A1 Jun. 25, 2015

Related U.S. Application Data

(62) Division of application No. 13/173,812, filed on Jun. 30, 2011, now Pat. No. 8,977,126.

(60) Provisional application No. 61/472,010, filed on Apr. 5, 2011.

(51) Int. Cl.
H04B 10/00 (2013.01)
H04B 10/27 (2013.01)
(Continued)

(52) U.S. Cl.
CPC ........... H04B 10/27 (2013.01); H04L 12/2801 (2013.01); H04L 41/0226 (2013.01); H04Q 11/0067 (2013.01); H04Q 2011/0079 (2013.01)

(58) Field of Classification Search
CPC .................................................. H04B 10/071
See application file for complete search history.

(56) References Cited

U.S. PATENT DOCUMENTS 8,630,540 B1* 1/2014 Arnold ................ H04L 41/0803
398/58
8,649,679 B2 2/2014 Shrikhande et al.
8,831,425 B1* 9/2014 Bernstein ........... H04B 10/2575
398/63

(Continued)

FOREIGN PATENT DOCUMENTS

CN 101534155 A 9/2009
WO WO 2005/076911 A2 8/2005

OTHER PUBLICATIONS

U.S. Appl. No. 14/622,498, Danny Leung.*

(Continued)

Primary Examiner — Danny Leung
(74) Attorney, Agent, or Firm — Sterne, Kessler, Goldstein & Fox PLLC

(57) ABSTRACT

Embodiments enable a network operator to use any (and a single) network management system (NMS) that it desires to manage a network having mixed fiber to the home optical network units (ONUs) and coaxial connected cable modems. For example, embodiments enable a cable company operator to use a DOCSIS (Data Over Cable Service Interface Specification) NMS (which the cable company already uses to manage its DOCSIS network) to manage such mixed network, by a simple addition of a DOCSIS Mediation Layer (DML) module between the NMS and the optical line terminal (OLT). On the other hand, embodiments enable a telephone company operator to use a standard EPON (Ethernet Passive Optical Network) OLT NMS with minor OLT and OAM (Operations, Administration, and Maintenance) protocol modifications to manage the same mixed network.

20 Claims, 17 Drawing Sheets

(51) Int. Cl.
  *H04L 12/28* (2006.01)
  *H04L 12/24* (2006.01)
  *H04Q 11/00* (2006.01)

(56) References Cited

U.S. PATENT DOCUMENTS

| | | | | | |
|---|---|---|---|---|---|
| 8,902,919 | B1* | 12/2014 | Shupe | | H04B 10/2575 370/442 |
| 2004/0252714 | A1* | 12/2004 | Oh | | H04Q 11/0067 370/437 |
| 2007/0291777 | A1* | 12/2007 | Jamieson | | G01D 5/00 370/401 |
| 2008/0232801 | A1* | 9/2008 | Arnold | | H04L 41/0803 398/58 |
| 2008/0310842 | A1* | 12/2008 | Skrobko | | H04B 10/25753 398/72 |
| 2009/0003237 | A1* | 1/2009 | Liu | | H04L 12/2883 370/254 |
| 2009/0103918 | A1* | 4/2009 | Tsuge | | H04L 12/2861 398/45 |
| 2010/0083330 | A1* | 4/2010 | Bernstein | | H04N 7/17309 725/111 |
| 2011/0069953 | A1* | 3/2011 | Bronstein | | H04L 12/2801 398/45 |
| 2011/0078755 | A1* | 3/2011 | Dai | | H04H 20/69 725/111 |
| 2011/0131624 | A1* | 6/2011 | Wu | | H04L 41/0226 725/111 |
| 2011/0211827 | A1* | 9/2011 | Soto | | H04B 10/071 398/25 |
| 2012/0257893 | A1* | 10/2012 | Boyd | | H04L 12/2801 398/58 |
| 2013/0004155 | A1* | 1/2013 | Liang | | H04Q 11/0067 398/9 |
| 2015/0063107 | A1* | 3/2015 | Missett | | H04L 45/66 370/235 |
| 2015/0180576 | A1* | 6/2015 | Boyd | | H04L 12/2801 398/58 |

OTHER PUBLICATIONS

Taiwanese Office Action directed to App. No. TW 101112035, dated Mar. 18, 2016; 5 pages.
Chinese Office Action directed to App. No. CN 201210097023.X, dated May 27, 2014; 6 pages.
English-language abstract of App. No. CN 101534155 A, published Sep. 16, 2009; 1 page.
European Search Report for European Application No. 12002271.0-1244, dated Aug. 1, 2012, 3 pages.

* cited by examiner

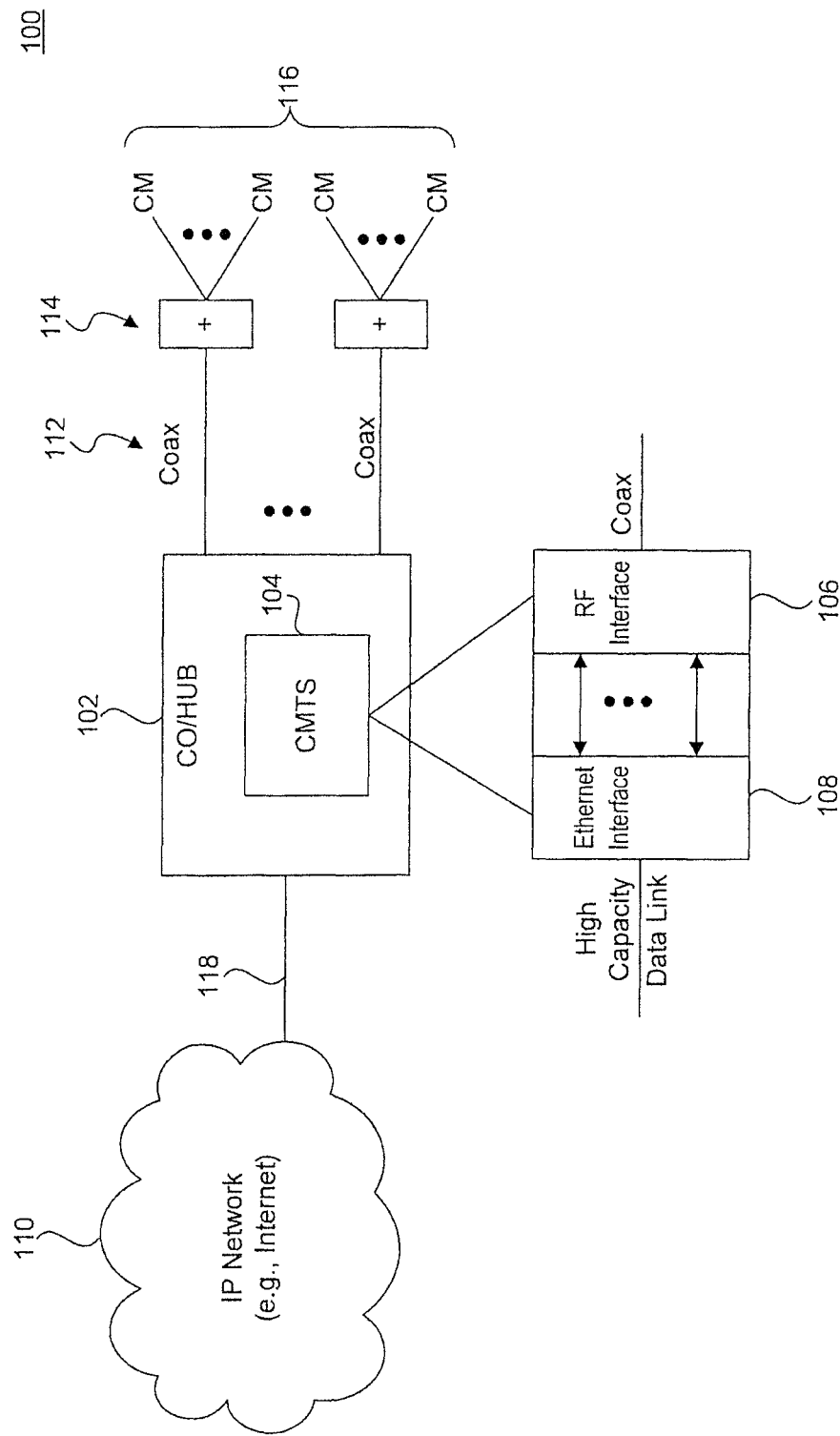
FIG. 1
(Conventional)

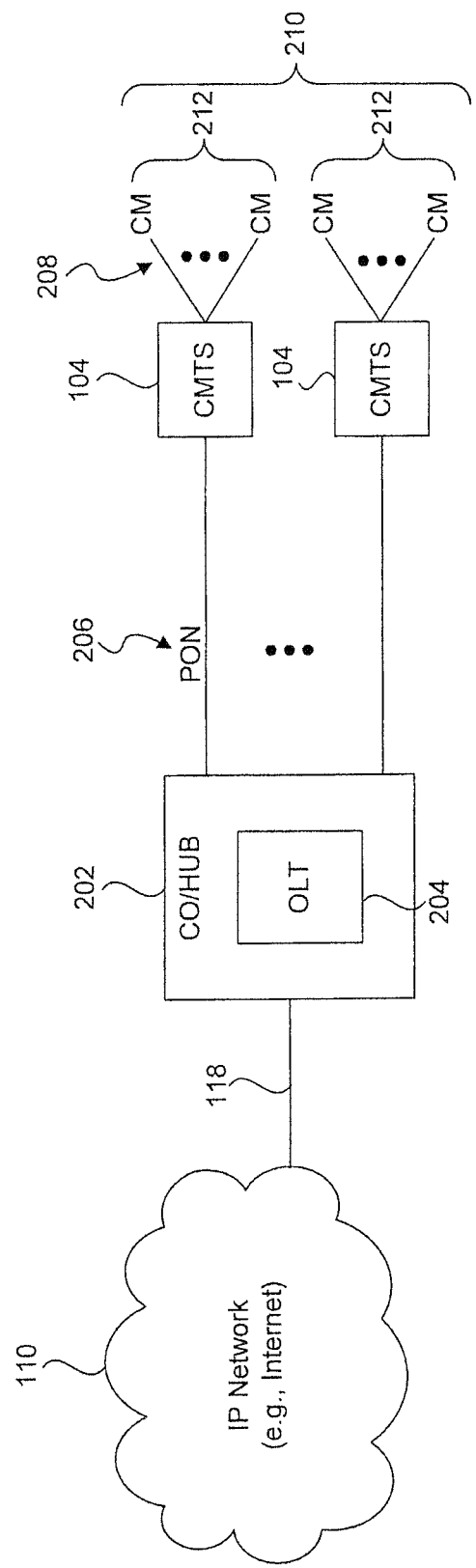
(Conventional)
FIG. 2

UNIFIED NETWORK MANAGEMENT OF HYBRID FIBER COAXIAL (HFC) NETWORK

CROSS-REFERENCE TO RELATED APPLICATIONS

The present application is a divisional application of U.S. application Ser. No. 13/173,812, filed Jun. 30, 2011, which claims the benefit of U.S. Provisional Application No. 61/472,010, filed Apr. 5, 2011, both of which are incorporated herein by reference in their entirety.

BACKGROUND

1. Field of the Invention

The present invention relates generally to hybrid fiber coaxial (HFC) networks.

2. Background Art

A hybrid fiber coaxial (HFC) network is a network that combines fiber optical lines and coaxial cables. HFC networks are commonly used by cable television (CATV) operators to provide television and high-speed data access.

A Passive Optical Network (PON) is a single, shared optical fiber that uses inexpensive optical splitters to divide a single fiber into separate strands feeding individual subscribers. An Ethernet PON (EPON) is a PON based on the Ethernet standard. EPONs provide simple, easy-to-manage connectivity to Ethernet-based, IP equipment, both at customer premises and at the central office. As with other Gigabit Ethernet media, EPONs are well-suited to carry packetized traffic.

Today, HFC networks commonly include PON (e.g., EPON) spans. The PON spans may extend all the way to the network subscribers in the case of fiber to the home (FTTH) optical network units (ONUs), for example, or connect to coaxial spans that reach the subscribers, in the case of standard cable modems (CMs).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 illustrates a conventional cable network.

FIG. 2 illustrates a conventional hybrid fiber coaxial (HFC) network.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Figure 3:
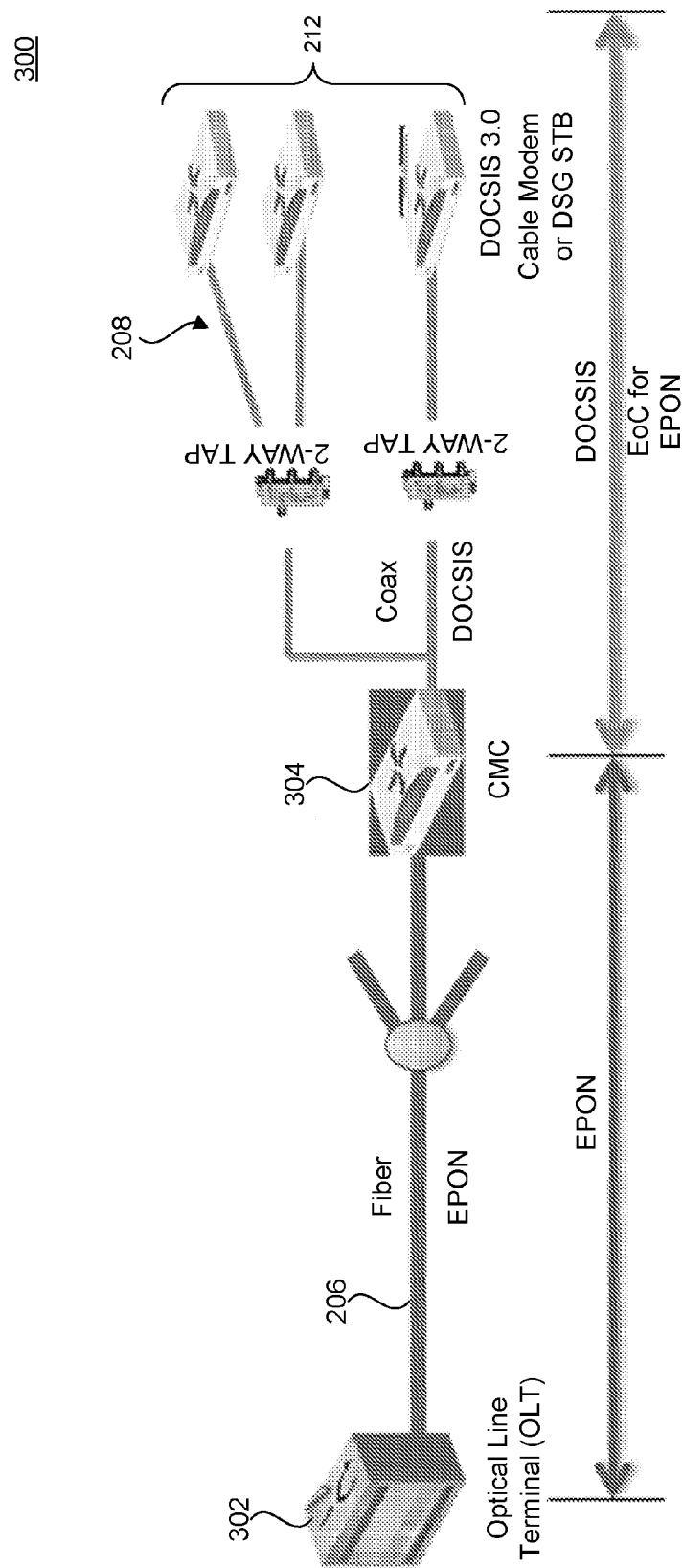
FIG. 3 illustrates an example EPON (Ethernet Passive Optical Network)-DOCSIS (Data Over Cable Service Interface Specification) EoC (Ethernet over Coaxial) HFC according to an embodiment of the present invention.

FIG. 1 illustrates a conventional high-speed cable network 100. Conventional network 100 includes a central office (CO) or a hub 102 that serves a cable modem (CM) population 116 having a plurality of CM (and set top box) subscribers. On the subscriber side, CO/Hub 102 is connected via a cable modem termination system (CMTS) 104 to a coaxial network 112, which connects CO/Hub 102 to CM population 116. On the high-speed network side, CO/Hub 102 is connected via CMTS 104 to a high capacity data link 118, which connects CO/Hub 102 to an Internet Protocol (IP) network (e.g., Internet) 110. In practice, CO/Hub 102 may include a plurality of CMTSs 104 (e.g., up to 10) in order to support cable modem population 116 served by CO/Hub 102. Further, CO/Hub 102 may connect to IP network 110 via a plurality of high capacity data links 118.

As shown in FIG. 1, CMTS 104 includes a Radio Frequency (RF) coax interface 106 and a high-speed (e.g., Ethernet) interface 108. RF coax interface 106 carries RF signals to and from CM population 116. RF coax interface 106 may connect to a plurality of coaxial cables, which may in turn individually aggregate traffic from a plurality of CM subscribers using combiners 114 located further downstream in cable network 100. Generally, traffic between CMTS 104 and CM population 116 is carried in Ethernet frames encapsulated inside DOCSIS (Data Over Cable Service Interface Specification) frames, for example. Ethernet interface 108 carries IP traffic to and from the IP network 110.

Typically, CMTS 104 serves a CM population that ranges from the low to high thousands (e.g. 5000-100,000). In addition, CMTS 104 includes a Layer 3 (L3) switch (i.e., network router) which performs IP packet routing. In the case of a CMTS connected to the Internet, for example, CMTS 104 includes a L3 switch that implements the OSPF (Open Shortest Path First) routing protocol. As such, CMTS 104 is a large, complex, and expensive network component.

FIG. 2 illustrates a conventional hybrid fiber coaxial (HFC) cable network 200. Conventional network 200 includes a central office (CO) or a hub 202 that serves a CM population 210. On the subscriber side, CO/Hub 202 is connected via an optical line terminal (OLT) 204 to a passive optical network (PON) 206, which connects CO/Hub 202 to CM population 210. Like conventional network 100, described above, on the high-speed network side, CO/Hub 202 is connected to a high capacity data link 118, which connects CO/Hub 102 to an IP network (e.g., Internet) 110.

CO/Hub 202 may include on or more OLTs 204 in order to support the CM population 210 served by CO/Hub 202. Each OLT 204 connects to a respective fiber optic line, which serves a respective CM segment 212 of CM population 210. OLT 204 may implement the IEEE Ethernet over PON (EPON) standard protocol (IEEE 802.3) or other data over PON protocol (e.g., Gibabit PON (G-PON) or Broadband PON (BPON)). In addition, OLT 204 typically supports both L3 and Layer 2 (L2) switching.

Connection between CM population 210 and OLT 202 is done via a hybrid fiber coaxial network. As shown in FIG. 2, the PON 206 is extended to a nearby vicinity of each CM segment 212 of the CM population 210, and then individual coaxial cable connections 208 are made to each CM subscriber of the CM segment 212. For example, a fiber optic line may be drawn to the basement of a multi-tenant building, and then individual coaxial connections made to each apartment in the multi-tenant building.

When CMs 210 are standard cable modems (i.e., not capable of running a PON data link layer), the coaxial cable connections 208 from the CMs must be terminated in the same manner as in a conventional coaxial cable network (e.g., cable network 100). As such, as shown in FIG. 2, a CMTS 104 is placed, for each CM segment 212 of the CM population 210, to terminate the coaxial cable connections 208 from that segment. CMTS 104 may implement DOCSIS or any other Ethernet over Coax (EoC) (standardized or non-standardized) protocol. In addition, CMTS 104 performs L3 switching as described above.

The conventional architecture of network 200 exists in various cable network markets today. When CM segments 212 are on the order of thousands of CM subscribers, placing a CMTS 104 to terminate coaxial connections as shown in FIG. 2 may be economically reasonable for cable network operators. However, in certain markets (e.g., China), the number of CM subscribers that connect to a particular CMTS 104 is much lower (on the order of hundreds), which makes this solution very cost ineffective for network operators. An alternative solution eliminates CMTS 104 from the architecture with a complete upgrade of CMs 210 to PON enabled CMs, such that only physical layer conversion is needed from coaxial connections 208 to PON 206. However, this alternative solution can also be expensive and may not always be feasible.

Embodiments of the present invention, as further described below, allow for the CMTS to be eliminated from the above described HFC architecture while requiring no upgrade to CMs (or set top boxes) of network subscribers. According to embodiments, the CMTS is replaced with a small size EoC (e.g., DOCSIS, MoCA, etc.) Coaxial Media Converter (CMC) that implements only a subset of the functions previously performed by the CMTS and additional conversion functions as further described below. In an embodiment, the CMC implements only EoC MAC and PHY layers, and can be scaled according to the number of CMs that are to be served by the CMC. From the network management side at the OLT, the CMC appears and can be managed like an optical network unit (ONU). From the subscriber side, the CMC provides the same connectivity functions over the coaxial cables as a CMTS and serves to terminate coaxial connections from the CMs. However, the CMC does not perform L3 or L2 switching as a CMTS, which allows the size, complexity, and cost of the CMC to be significantly reduced compared to a CMTS. Instead, embodiments, as further described, exploit the L3 and L2 switching capabilities of OLTs to move L3 and L2 switching to the OLT and thus only perform simple mapping/translation at the CMC.

Embodiments of the present invention will now be described. As would be understood by a person of skill in the art based on the teachings herein, embodiments are not limited to the examples described herein. For example, embodiments will be described with reference to an EPON-DOCSIS HFC. However, embodiments are not limited to such PON or EoC technologies and any other combinations of PON/EoC technologies may be used. Further, example implementations of hardware circuitry and/or software for enabling the embodiments are provided for the purpose of illustration only and are not limiting.

FIG. 3 illustrates an example EPON-DOCSIS HFC network 300 according to an embodiment of the present invention. As shown in FIG. 3, example network 300 includes an OLT 302 and a CMC 304 that serve a CM segment 212. CM segment 212 includes a plurality of CMs and set top boxes.

OLT 302 and CMC 304 are connected via a PON 206. In an embodiment, OLT 302 and CMC 304 use EPON to communicate over PON 206. CMC 304 replaces the CMTS in the conventional architecture described above in FIG. 2. Thus, CMC 304 connects to individual CMs of CM segment 212 via coaxial cable connections 208 as shown in FIG. 2. In an embodiment, an EoC technology, such as DOCSIS, is used over coaxial cable connections 208.

Accordingly, CMC 304 bridges the PON technology used over PON 206 and the EoC technology used over coaxial connections 208. In particular, CMC 304 terminates the PON protocol used by OLT 302 and converts traffic to the EoC protocol used by CMs 212. In an embodiment, CMC 304 bridges EPON and DOCSIS to enable end-to-end communication over the HFC network between EPON OLT 302 and DOSCIS CMs 212.

CMC 304 appears like an ONU on the PON 206 span of the HFC network. Thus, CMC 304 can be configured by OLT 302 in the same manner as an ONU. On the coaxial span of the HFC network, CMC 304 provides traffic scheduling by assigning timeslots to CMs 2121, and aggregates the traffic from CMs 212 onto PON LLIDs (Logical Link Identifiers). In addition, CMC 304 provides DOCSIS management (e.g., configuration files, SNMP, etc.) as necessary to emulate to the CMs 2121 that they are operating on an end-to-end DOCSIS network.

Figure 4:
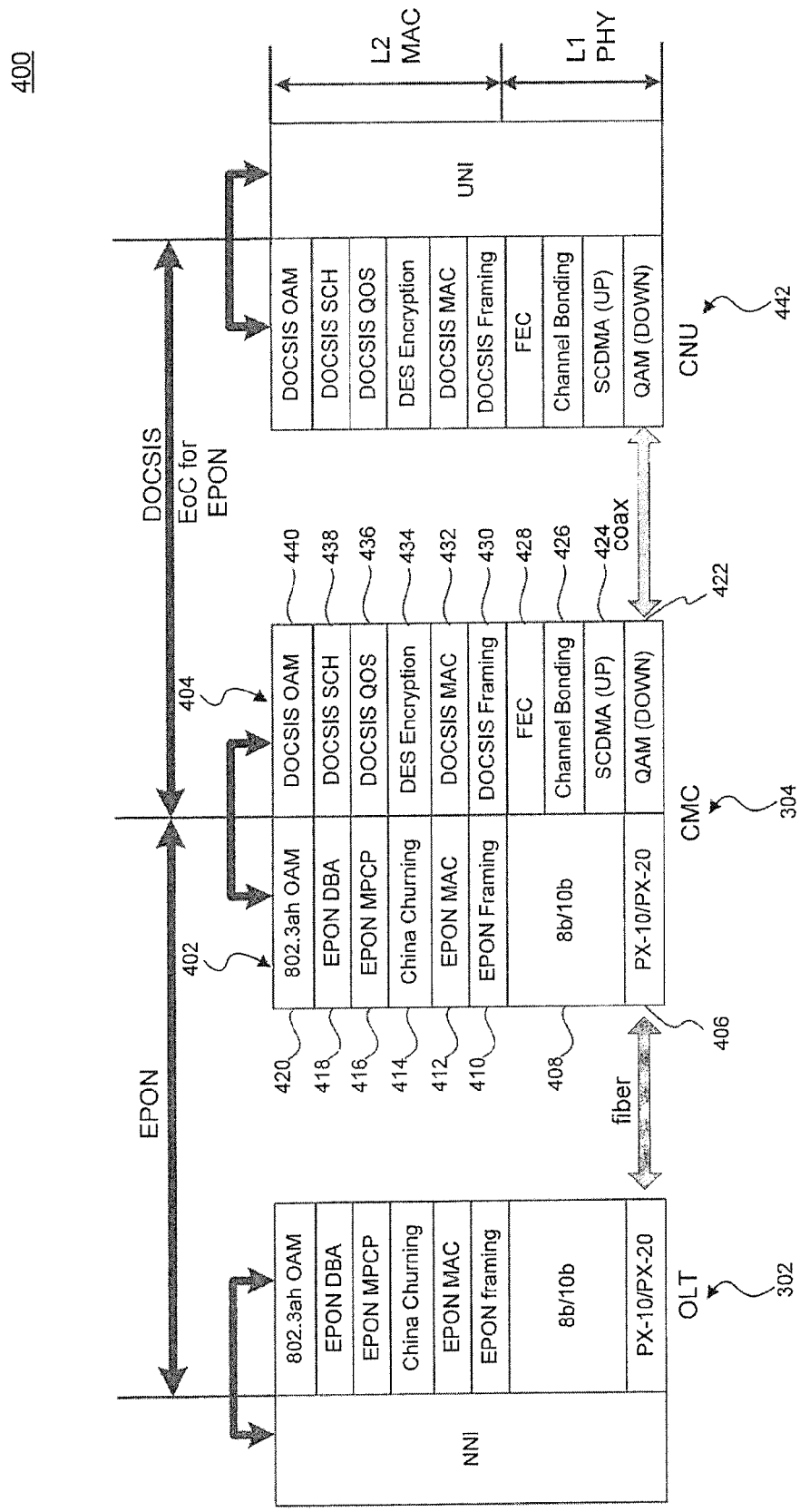
FIG. 4 illustrates an example EPON to DOCSIS EoC conversion according to an embodiment of the present invention.

FIG. 4 illustrates an example 400 of EPON to DOCSIS EoC conversion according to an embodiment of the present invention. In particular, example 400 shows some of the networking layers, functions, or modules that may be implemented in CMC 304 according to embodiments. As would be understood by a person of skill in the art based on the teachings herein, other network layers and/or functions may be implemented depending on the particular PON and EoC technologies used over the HFC network. In addition, CMC 304 may implement more or less layers, functions, and/or modules if needed.

In example 400, CMC 304 includes an EPON interface 402 and a DOCSIS interface 404. In an embodiment, EPON interface 402 implements an EPON PHY layer (including a power control function 406, a line encoding function 408, and an EPON framing function 410), an EPON MAC sublayer 412, a subset of EPON Data Link layer functions (including link layer encryption function 414 (e.g., China churning), EPON MPCP (Multipoint Control Protocol) 416, and EPON DBA (Dynamic Bandwidth Allocation) 418), and OAM (Operations, Administration, and Maintenance) functions 420.

DOCSIS interface 404 similarly implements a DOCSIS PHY layer (which implements, for example, a QAM (Quadrature Amplitude Modulation) function 422 for use in downstream communication, a SCDMA (Synchronous Code Division Multiple Access) function 424 for use in upstream communication, Channel Bonding functions 426 to support channel bonding as described in DOCSIS 3.0, FEC (forward error correction) functions 428, and DOCSIS framing functions 430), a DOCSIS MAC sublayer 432, a subset of DOCSIS Data Link layer functions (including a DES (Data Encryption Standard) encryption function 434, a DOCSIS QoS (Quality of Service) 436, and a DOCSIS SCH (Scheduling) function 438), and DOCSIS OAM functions 440.

According to embodiments, CMC 304 may implement more or less layers, functions, and/or modules, while continuing to provide the bridging from EPON to DOCSIS, and vice versa. It is important to note that, according to embodiments, although CMC 304 may implement certain Data Link layer functions as described above, CMC 304 does not implement L2 switching (sometimes referred to as "bridging" in the art), which typically requires a L2 MAC address bridge that uses MAC destination address (DA) lookup for switching decisions.

Figure 5:
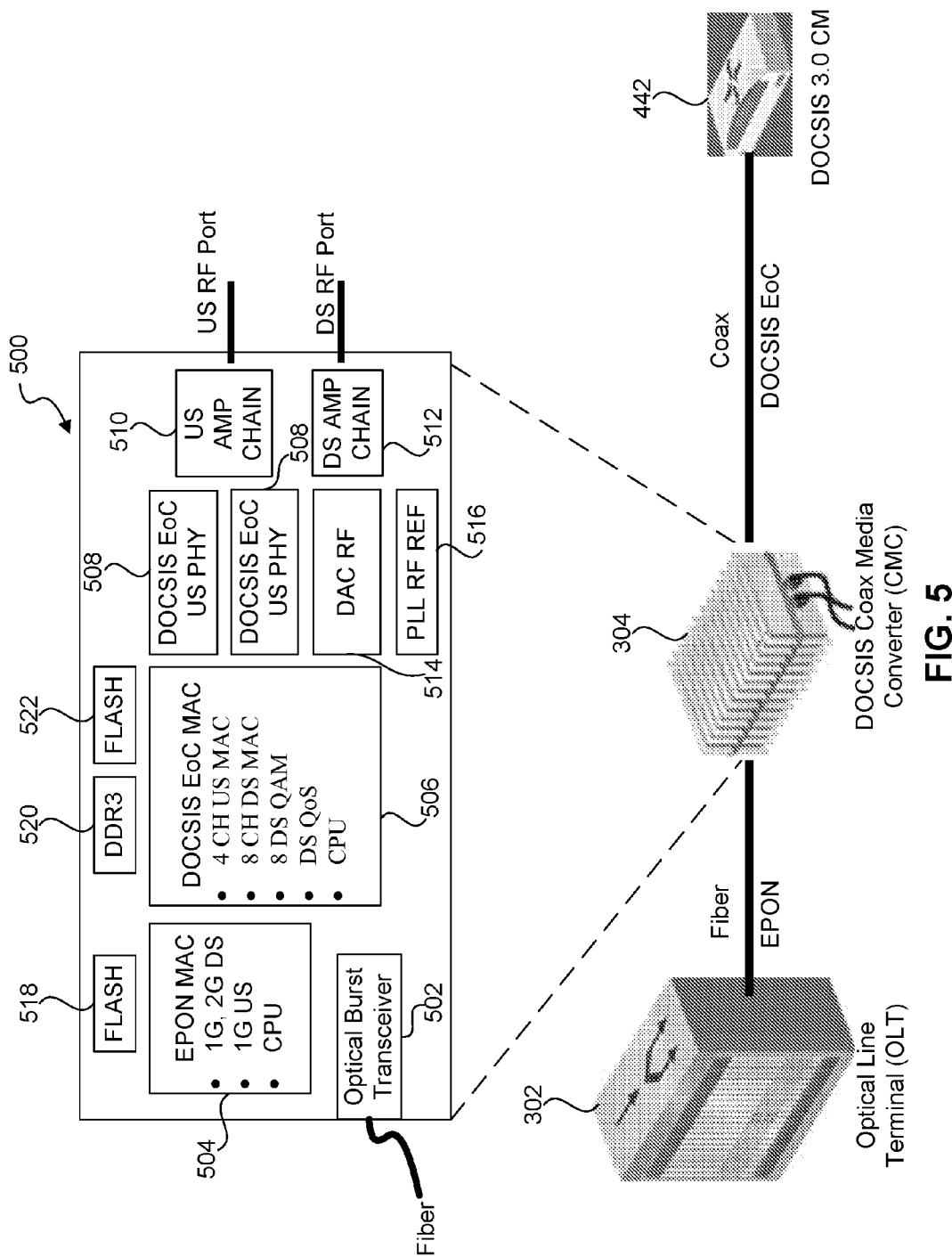
FIG. 5 illustrates an example implementation of a DOCSIS coaxial media converter (CMC) according to an embodiment of the present invention.

FIG. 5 illustrates an example implementation 500 of DOCSIS coaxial media converter (CMC) 304 according to an embodiment of the present invention. DOCSIS CMC 304 sits between OLT 302 and a DOCSIS CM 442. As shown in FIG. 5, example DOCSIS CMC implementation 500 includes, among other components, an optical burst transceiver 502, an EPON MAC chip 504, a DOCSIS EoC MAC chip 506, and one or more DOCSIS EoC PHY chips 508. As would be understood by a person of skill in the art, one or more of the EPON MAC, DOCSIS EoC MAC, and DOCSIS EoC PHY chips may be integrated in a single chip in other implementations.

Optical burst transceiver 502 is coupled to a fiber optic line, which connects DOCSIS CMC 304 to OLT 302. Accordingly, in downstream communication, optical burst transceiver 502 receives EPON PHY encoded signals from OLT 302. From the EPON PHY encoded signals, transceiver 502 generates and forwards EPON MAC frames to EPON MAC chip 504. In upstream communication, transceiver 502 receives EPON MAC frames from EPON chip 504, which it transmits using EPON PHY signaling over the fiber optic line.

EPON MAC chip 504 implements an EPON MAC layer. In an embodiment, EPON MAC chip 504 supports downstream data rates of 1 or 2 Gbps and an upstream data rate of 1 Gbps. EPON MAC chip 504 terminates the EPON MAC link with the EPON MAC layer of OLT 302. Thus, in downstream communication, EPON MAC chip 504 receives EPON MAC frames from transceiver 502, removes the EPON headers from the received EPON MAC frames, and forwards the encapsulated Ethernet frames to DOCSIS EoC chip 506. In upstream communication, EPON MAC chip 504 receives Ethernet frames from DOCSIS EoC chip 506, which it encapsulates into EPON MAC frames by adding appropriate EPON headers (e.g., a LLID assigned to CMC 304) and sends to optical burst transceiver 502 for transmission onto the fiber optic line to OLT 302.

DOCSIS EoC MAC chip 506 performs similar functions as EPON MAC chip 504 but with respect to the coaxial side of CMC 304. In particular, DOCSIS EoC MAC chip 506 implements a DOCSIS MAC layer. DOCSIS EoC MAC chip 506 terminates the DOCSIS MAC link with DOCSIS CM 442. In downstream communication, DOCSIS EoC MAC chip 506 receives Ethernet frames from EPON MAC chip 504, adds appropriate DOCSIS headers to the Ethernet frames to generate DOCSIS MAC frames, and forwards the DOCSIS MAC frames to DOCSIS EoC PHY chips 508 for transmission on the coaxial cable to DOCSIS CM 442. In upstream communication, DOCSIS EoC MAC chip 506 receives DOCSIS MAC frames from DOCSIS EoC PHY chips 508, removes the DOCSIS headers from the received DOCSIS MAC frames, and forwards the encapsulated Ethernet frames to EPON MAC chip 504.

DOCSIS EoC chips 508 enable data transmission/reception over the coaxial cable. In downstream communication, DOCSIS EoC PHY chips 508 receive DOCSIS MAC frames from DOCSIS EoC MAC chip 506, which they transmit over the coaxial cable using DOCSIS PHY signaling. In upstream communication, DOCSIS EoC PHY chips 508 receives DOCSIS PHY encoded signals from CM 442, from which they generate and forward DOCSIS MAC frames to DOCSIS EoC MAC chip 506.

As shown in FIG. 5, EPON MAC chip 504 and DOCSIS EoC MAC chip 506 may have associated Flash memory or Random Access Memory (RAM), such as flash memory unit 518, DDR (Double Data Rate) memory unit 520, and flash memory unit 522. Also, on the coaxial side of CMC 304, conventional analog circuitry (such as upstream amplifier chain 510, downstream amplifier chain 512, digital-to-analog converter 514, and phase locked loop 516) may be used together with PHY chips 508 to enable transmission and reception over the coaxial cable. As would be understood by a person of skill in the art based on the teachings herein, CMC 304 may be implemented differently than in example implementation 500.

Figure 6:
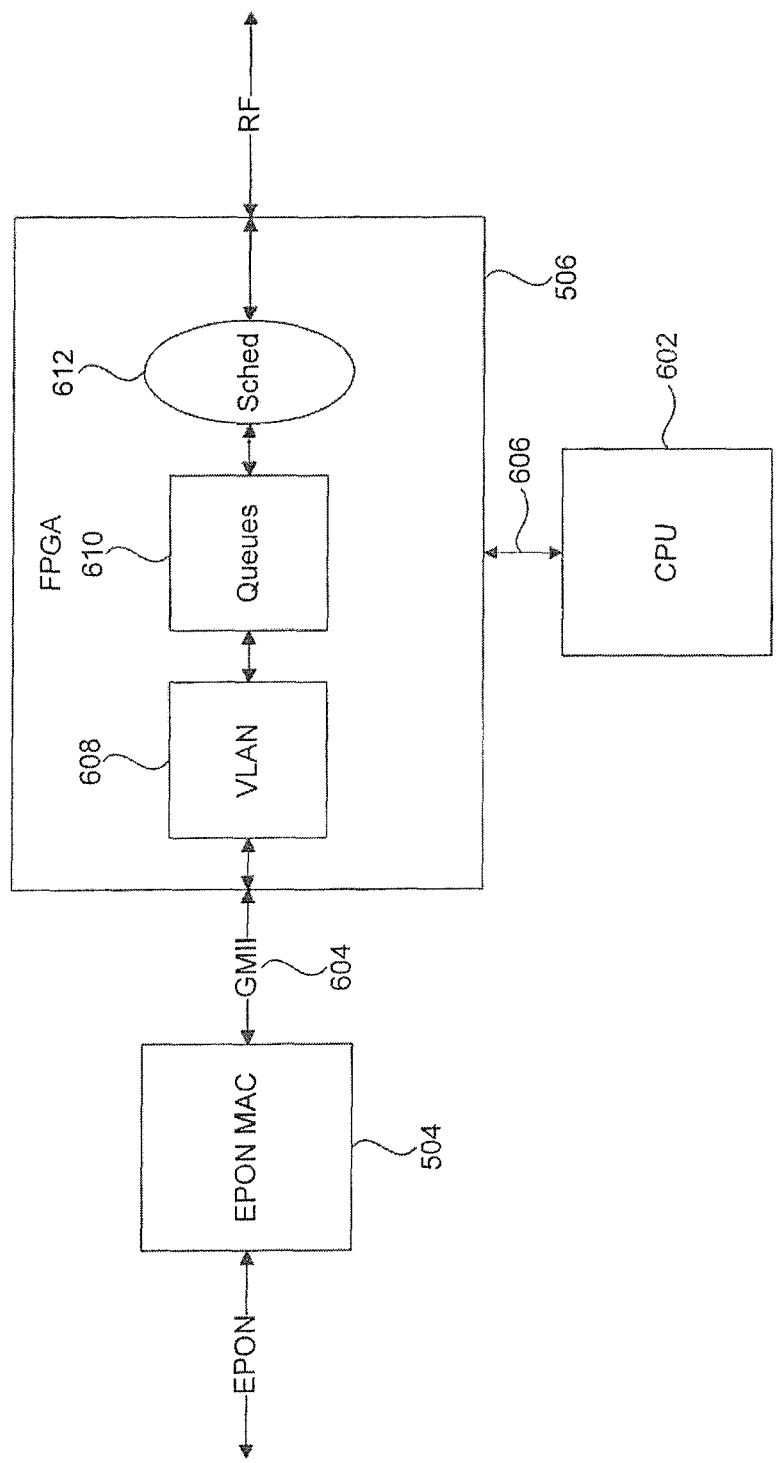
FIG. 6 illustrates another example implementation of a DOCSIS CMC according to an embodiment of the present invention.

FIG. 6 illustrates another example implementation 600 of DOCSIS CMC 304 according to an embodiment of the present invention. For simplification, some of the elements of CMC 304 (described above in FIG. 5) are not shown in example implementation 600.

As shown in FIG. 6, in example implementation 600, EPON MAC chip 504 is connected to DOCSIS EoC MAC chip 506 via a GMII (Gigabit Media Independent Interface) interface 604. A central processing unit (CPU) 602 controls DOCSIS EoC MAC chip 506 via an interface 606. In addition, CPU 602 controls EPON MAC chip 504 via in-band OAM messages switched through DOCSIS EoC MAC chip 506.

DOCSIS EoC MAC chip 506 is implemented as a FPGA (Field Programmable Gate Array). In an embodiment, DOCSIS EoC MAC chip 506 includes a VLAN (Virtual Local Area Network) switch 608, a plurality of queues 610, and a scheduler 612.

VLAN switch 608 performs VLAN switching of Ethernet frames between EPON MAC chip 504 and queues 610. VLAN switching at VLAN switch 608 is enabled, according to embodiments, by inserting a VLAN tag (e.g., IEEE VLAN, S-VLAN, etc.) in Ethernet frames communicated between OLT 302 and CMC 304. The VLAN tag, when inserted by OLT 302, identifies a cable modem (CM) (using a CM index) to which an Ethernet frame is destined and a class of service (CoS) for the Ethernet frame. Similarly, when inserted by CMC 304, the VLAN tag identifies the CM (via its CM index) from which the Ethernet frame originated and the CoS for the Ethernet frame. According to embodiments, the VLAN tag can be inserted inside the Ethernet frame (e.g., before the EtherType/Size field) or at the beginning of the Ethernet frame.

According to embodiments, VLAN switching at CMC 304 includes a mapping/translation of a VLAN tag to a queue number, and vice versa, by VLAN switch 608. An example that illustrates upstream and downstream VLAN switching according to an embodiment of the present invention is shown in FIG. 7.

Figure 7:
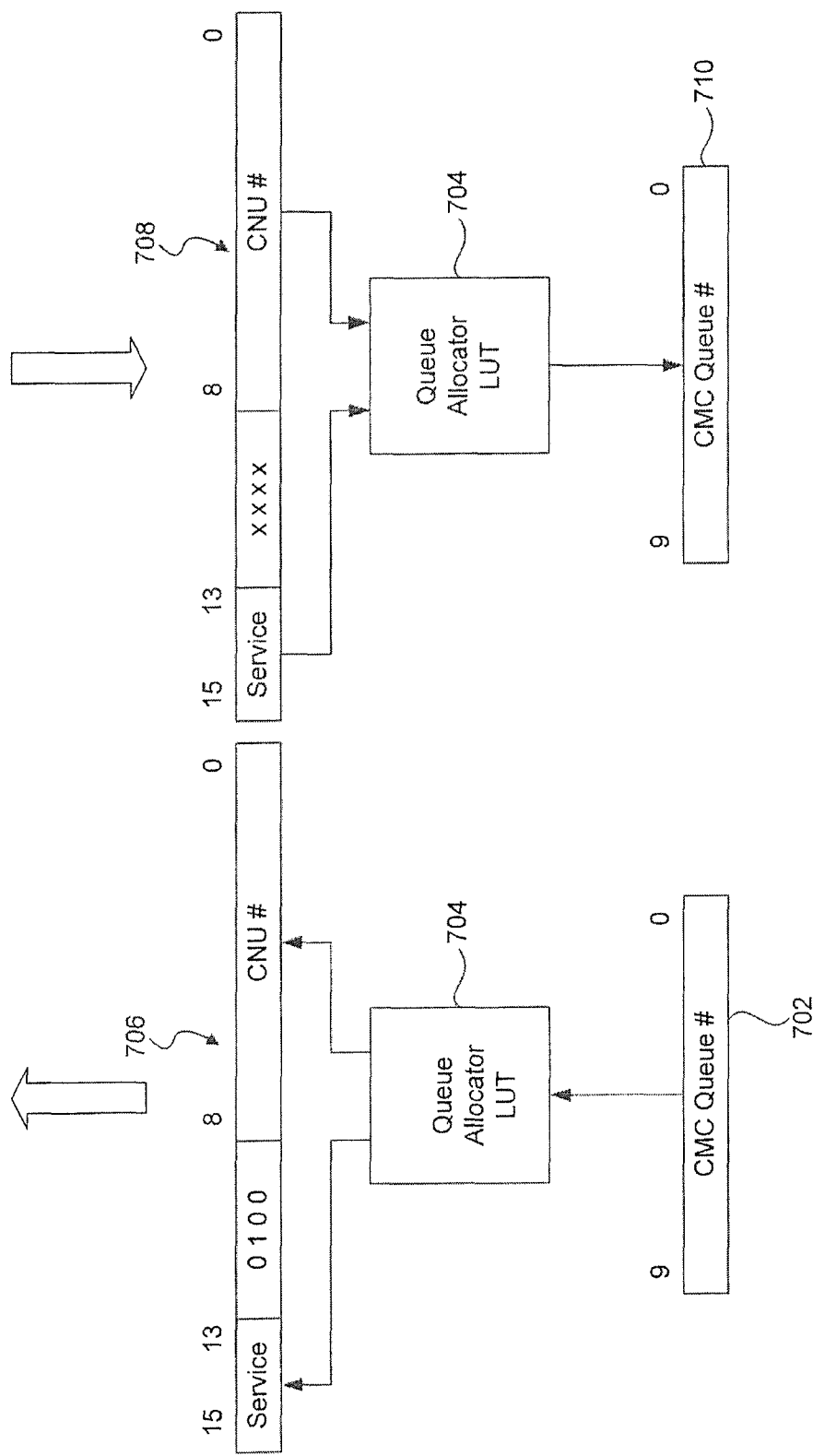
FIG. 7 illustrates example upstream and downstream VLAN switching according to an embodiment of the present invention.

As shown in FIG. 7, in upstream communication (i.e., from CMC 304 to OLT 302), VLAN switch 608 receives a queue number 702, which represents the number of an upstream queue (from queues 610) from which an Ethernet frame is to be transmitted. VLAN switch 608 invokes a queue allocator LUT (look up table) 704 to retrieve the CM index (i.e., the CM) and the CoS currently assigned to the queue with queue number 702. Then, VLAN switch 608 generates a VLAN tag (or a portion thereof) from the CM index and the CoS (in FIG. 7, the CM index is denoted "CNU #" and the Cos is denoted as "Service"), inserts the generated VLAN tag into the Ethernet frame, and forwards the Ethernet frame to EPON MAC chip 504. EPON MAC chip 504 uses the CoS from the Ethernet frame to map the frame to a LLID (different LLIDs are used for different CoS), which is appended to the Ethernet as part of the EPON header, before transmission onto the fiber optic line.

In downstream communication (i.e., from CMC 304 to a CM), VLAN switch 608 receives an Ethernet frame having a VLAN tag 708 embedded therein by the OLT 302. (Note that EPON MAC chip 504 removes the EPON header before forwarding the frame to DOCSIS EoC MAC chip 506). VLAN switch 608 strips off the VLAN tag 708 (or a portion thereof) from the Ethernet frame, and invokes queue allocator LUT 704 to retrieve (by reverse lookup) a queue number 710 based on the CM index and the CoS contained in the VLAN tag. Queue number 710 is the number of the downstream queue (from queues 610) currently assigned to the CM index and the CoS contained in VLAN tag 708.

In an embodiment, CMC 304 supports up to 512 CMs. Thus, DOCSIS EoC MAC chip 506 includes 1024 queues in each direction (upstream and downstream). CMC 304 can be configured to allocate 2 upstream and 2 downstream queues per CM, thus enabling 2 CoS (i.e., service flows) per CM. In another embodiment, CMC 304 dynamically allocates its queues 610 to support currently active service flows from the CMs. Thus, a CM may be allocated as many queues as necessary to support its service flows based on availability.

Figure 8:
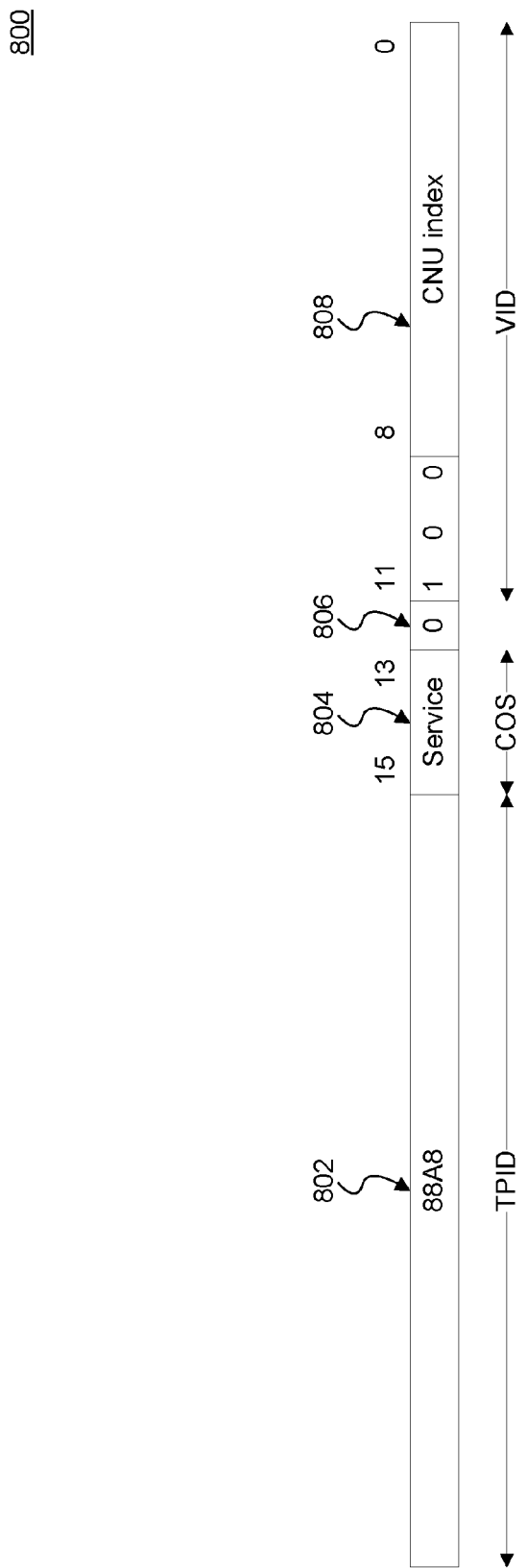
FIG. 8 illustrates an example VLAN tag according to an embodiment of the present invention.

FIG. 8 illustrates an example VLAN tag 800 used to enable VLAN switching at CMC 304 according to an embodiment of the present invention. Example VLAN tag 800 is an IEEE S-VLAN (Service VLAN) tag with a 16-bit TPID (Tag Protocol Identifier) field 802 set to 0x88A8, a 3-bit Service field 804 that identifies the CoS for the frame, a fixed CFI (Canonical Format Indicator) bit 806 set to 0, and a 12-bit VLAN ID (VID) field 808 having a fixed 3-bit portion and a variable portion (9 least significant bits) that identifies the CM index of the source/destination CM.

As described above, the VLAN switching scheme at CMC 304 maps a CM index, CoS pair to a queue, and vice versa. Accordingly, each CM connected to CMC 304 must be assigned a unique CM index (e.g., integer between 0 and 511) at the time it connects and registers to CMC 304. This CM index continues to identify the CM as long as the CM is connected to CMC 304. If the CM disconnects from CMC 304 or is reset, its CM index number is released and may be assigned to another CM. When the CM re-connects and re-registers with CMC 304, the CM is assigned another CM index, which may or may not be the same as its previous CM index.

At the OLT side, OLT 302 must learn CM indices that are assigned to CMs that join the network. To do so, OLT 302 examines the MAC source addresses of incoming Ethernet frames. When OLT 302 determines a MAC source address that is unknown to it (i.e., not present in its MAC DA lookup table), it checks the Ethernet frame for a VLAN tag inserted by the CMC 304. As described above, CMC 304 tags Ethernet frames with VLAN tags that contain the CM index of the originating CM. OLT 302 then creates an entry into its MAC DA lookup table that associates the previously unknown MAC address with the CM index contained in the VLAN tag. Subsequently, OLT 302 may use the CM index to generate VLAN tags to insert into Ethernet frames destined to the MAC address.

Since CM indices can be reassigned when CMs disconnect, OLT 302 must snoop CM arrival and departure messages from CMC 304. On receiving a CM departure message, OLT 302 clears all learned MAC addresses associated with the departing CM.

Referring back to FIG. 6, DOCSIS EoC MAC chip 506 also includes a scheduler 612. Scheduler 612 provides traffic scheduling by assigning timeslots to the CMs connected to CMC 304. In addition, scheduler 612 may perform aggregation of traffic into queues 610 based on the CoS of the incoming traffic. This aggregation based on CoS by scheduler 612 enables LLID aggregation based on CoS on the fiber optic line to OLT 302. Information on how to configure scheduler 612 may be received through ONU SLA (Service Level Agreement) messages from OLT 302. Note that CMC 304 terminates the OAM link (typically between an OLT and an ONU). Therefore CMC 304 can examines OAM SLA messages and program its hardware accordingly. In addition, CMC 304 may in turn send commands to a particular CM (via standard DOCSIS commands) to instruct the CM to perform queuing and shaping as needed to meet the SLA end-to-end.

Figure 9:
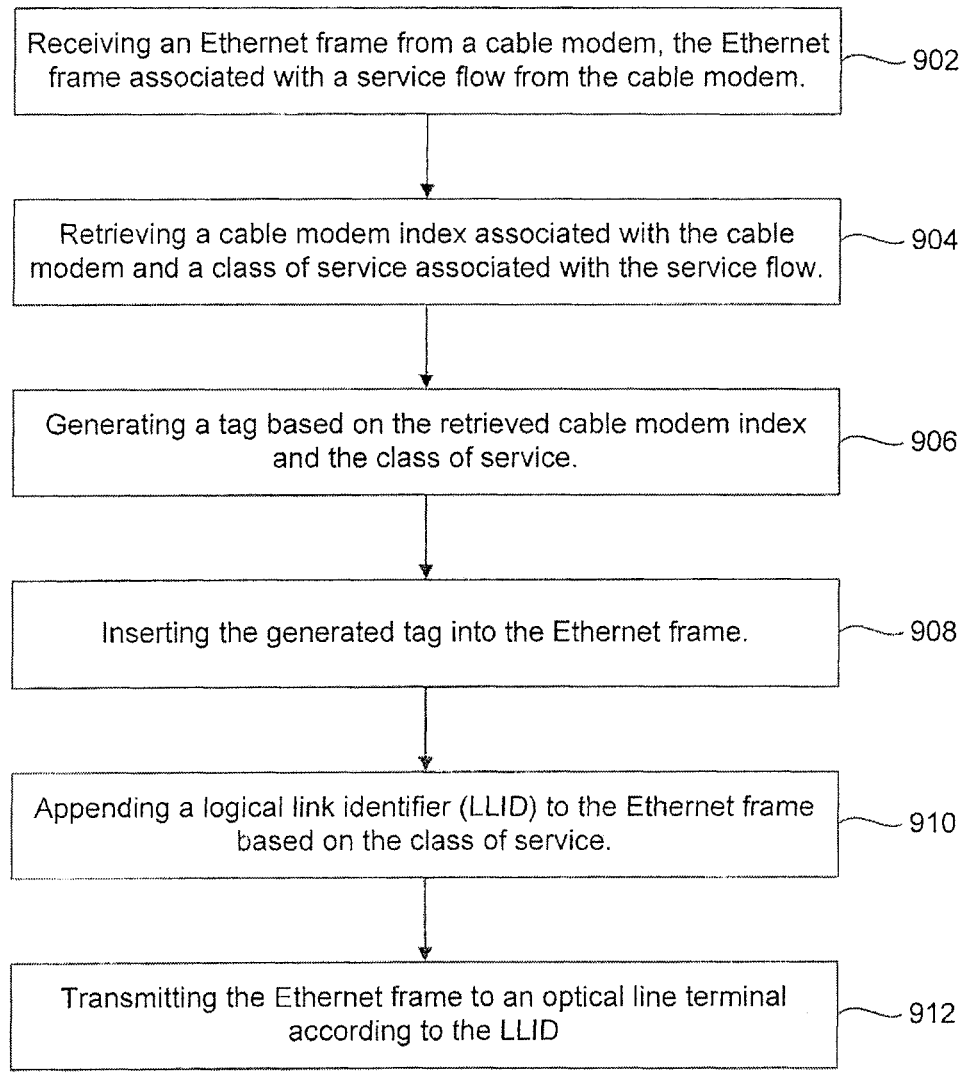
FIG. 9 is a process flowchart of a method for traffic switching according to an embodiment of the present invention.

FIG. 9 is a process flowchart 900 that illustrates a method for traffic switching according to an embodiment of the present invention. Process 900 is performed in a CMC, such as CMC 304 for example, to switch upstream traffic from a CM to an OLT. As shown in FIG. 9, process 900 begins in step 902, which includes receiving an Ethernet frame from a cable modem, the Ethernet frame associated with an upstream service flow from the cable modem. In an embodiment, step 902 further includes placing the Ethernet frame in a queue, where the queue is statically or dynamically assigned to the upstream service flow from the cable modem.

Step 904 includes retrieving a cable modem index associated with the cable modem and a class of service associated with the upstream service flow. In an embodiment, step 904 is performed by mapping (via a lookup table) a queue number of the queue where the Ethernet frame is placed in step 902 to a cable modem index and a class of service.

Step 906 includes generating a tag based on the retrieved cable modem index and the class of service. In an embodiment, the tag is an IEEE VLAN tag having a class of service field and a cable modem index field.

Step 908 includes inserting the generated tag into the Ethernet frame. In an embodiment, the tag is appended to the Ethernet frame. In another embodiment, the tag is inserted inside the Ethernet frame.

Step 910 includes appending a logical link identifier (LLID) to the Ethernet frame based on the class of service associated with the upstream service flow.

Finally, step 912 includes transmitting the Ethernet frame to an optical line terminal according to the LLID.

Figure 10:
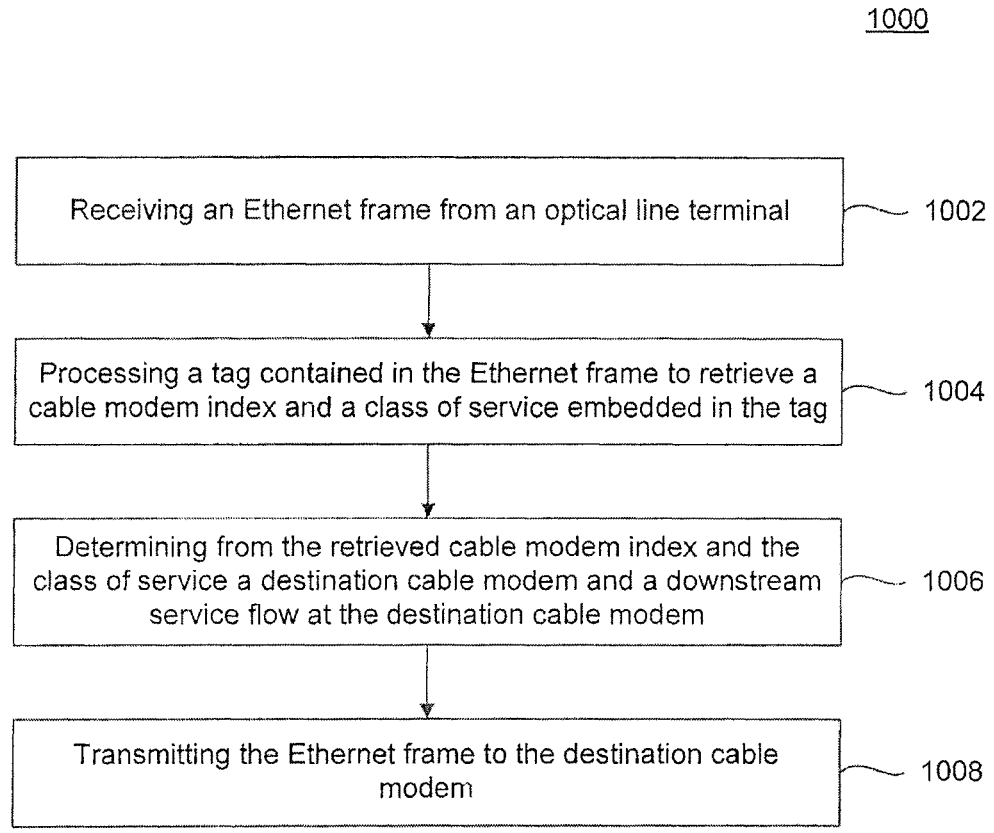
FIG. 10 is a process flowchart of a method for traffic switching according to an embodiment of the present invention.

FIG. 10 is another process flowchart 1000 that illustrates a method for traffic switching according to an embodiment of the present invention. Process 1000 is performed in a CMC, such as CMC 304 for example, to switch downstream traffic from an OLT to a CM. As shown in FIG. 10, process 1000 begins in step 1002, which includes receiving an Ethernet frame from an optical line terminal.

Step 1004 includes processing a tag contained in the Ethernet frame to retrieve a cable modem index and a class of service embedded in the tag. In an embodiment, the tag is an IEEE VLAN tag having a class of service field and a cable modem index field.

Step 1006 includes determining from the retrieved cable modem index and the class of service a destination cable modem and a downstream service flow at the destination cable modem. In an embodiment, step 1006 is performed by mapping (via a lookup table) the cable modem index and the class of service to a queue number, where the queue number identifies a queue assigned to traffic destined to the downstream service flow at the destination cable modem. The queue is statically or dynamically assigned to the downstream service flow at the cable modem.

Finally, step 1008 includes transmitting the Ethernet frame to the destination cable modem. In an embodiment, step 1008 further includes placing the Ethernet frame in the queue assigned to the downstream service flow at the destination cable modem.

As noted above, CMC 304 (and DOCSIS EoC MAC chip 506) does not implement L2 switching, which typically requires a L2 MAC address bridge that uses MAC destination address (DA) lookup for switching decisions. Instead, as described above, simple VLAN-based switching is used at CMC 304, and L2 switching (which is typically done by a CMTS) is performed at the OLT 302. As noted above, OLT 302 has existing L3 and L2 switching capabilities. Thus, only minimal modifications are required at OLT 302 to enable the VLAN-based switching at CMC 304.

Example traffic processing performed at OLT 302 according to embodiments is described below. The traffic processing may be performed by a host interface at OLT 302. In an embodiment, individual CMs are modeled as Destinations in the OLT host interface and are identified in the OLT host interface by their MAC addresses. In an embodiment, up to 64 CMCs and 4000 Destinations are supported by a single OLT.

ONUs connected to OLT 302 have respective OLT Domains in the OLT host interface. CMCs connected to OLT 302 are treated as ONUs and thus also have OLT Domains in the OLT host interface. Additionally, however, traffic destined to CMCs is identified by the network carrier using a network S-VLAN tag (different than the VLAN tag described above, which is inserted into traffic between CMC 304 and OLT 302). The network S-VLAN tags map to OLT domains (which are CMC domains that serve CM Destinations).

Figure 11:
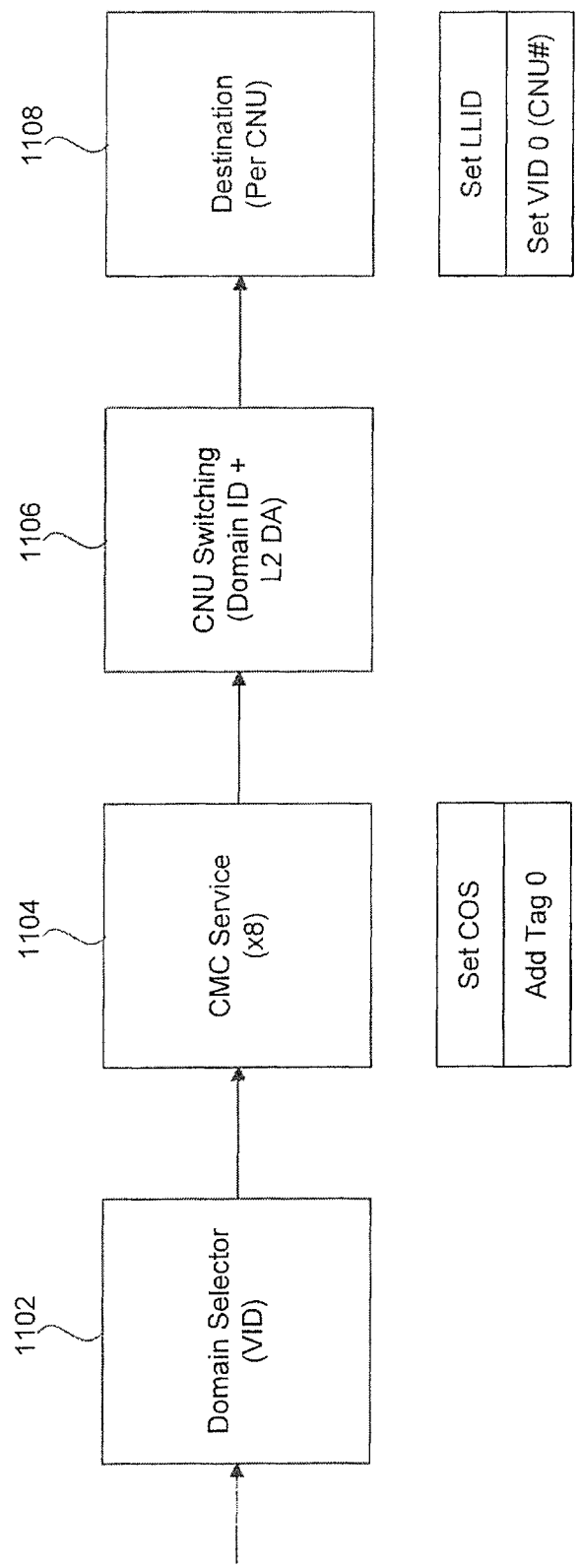
FIG. 11 illustrates example OLT (Optical Line Terminal) downstream traffic processing according to an embodiment of the present invention.

FIG. 11 illustrates example OLT downstream (i.e., from OLT 302 to CMC 304) traffic processing according to an embodiment of the present invention. As shown in FIG. 11, processing begins in step 1102, which includes a Domain Selector module selecting an OLT Domain (i.e., CMC) for the traffic based on the VID field of the network S-VLAN tag. In step 1104, a CMC VLAN tag is added into the Ethernet frames and the Service field is set according to a desired CoS. Then, L2 switching based on the selected OLT Domain is performed in step 1106. In particular, L2 MAC DA lookup within the OLT Domain selected is performed on the Ethernet frame. This L2 DA lookup maps to a particular Destination (i.e., CM) within the selected OLT Domain. Finally, in step 1108, the VID field of the CMC VLAN tag is set to the CM index associated with the particular Destination determined in step 1006, and an appropriate LLID is set for the Destination.

Figure 12:
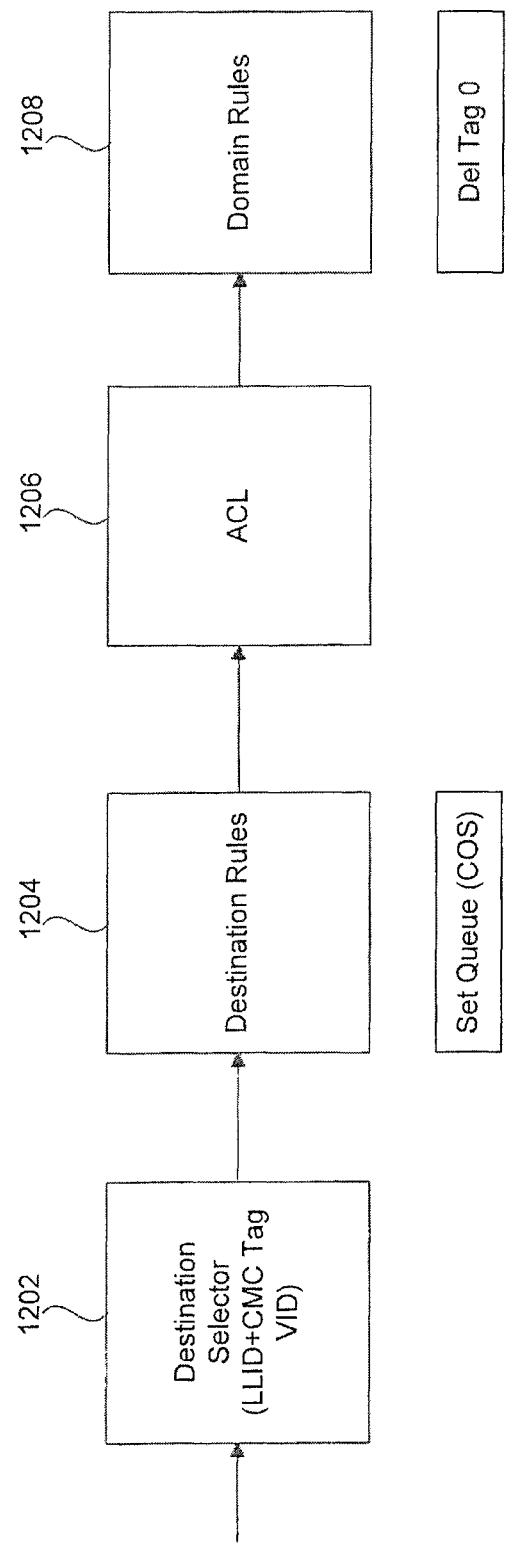
FIG. 12 illustrates example OLT upstream traffic processing according to an embodiment of the present invention.

FIG. 12 illustrates example OLT upstream (i.e., from OLT 302 to the IP network) traffic processing according to an embodiment of the present invention. As shown in FIG. 12, processing begins in step 1202, in which a Destination Selector module identifies the Destination (i.e., CM destination) for the traffic based on the LLID from the CMC and the VID field of the CMC inserted VLAN tag. In step 1204, Destination rules are applied, which include selecting a queue (from a set of queues associated with that Destination) based on the Service field (CoS) of the CMC inserted VLAN tag. Then, ACL (Access Control List) lookup is performed in step 1206, and Ethernet frames with MAC addresses that pass the ACL lookup are placed in the OLT Domain that serves the Destination. The VLAN tag is deleted from the Ethernet frames by the Domain Rules for the OLT Domain in step 1208.

Embodiments, as described above, thus enable traffic bridging between PON (e.g., EPON) and EoC (e.g., DOCSIS) technologies. Accordingly, an OLT can simultaneously serve fiber connected ONUs and CMs over the same PON. However, fiber connected ONUs and CMs are designed to operate with different network management systems (NMS) for configuration and provisioning. For example, standard DOCSIS CMs are designed to operate with the SNMP (Simple Network Management Protocol) adopted by DOCSIS. The EPON standard, on the other hand, has defined a NMS based on a Layer 2 OAM protocol that can be specified by operators (e.g., China Telecom, NTT, Time Warner, etc.) of the EPON.

Accordingly, in order to operate an EPON-DOCSIS EoC network having mixed fiber connected ONUs (e.g., FTTH) and coaxial connected CMs, both types of management abilities must be provided. However, it would be cost ineffective to have to modify OLTs in order to separately support DOCSIS management, for example, in addition to existing EPON management. Instead, it is desirable, as enabled by embodiments further describe below, to have a unified network management system at the OLT that manages both ONUs and CMs, and that requires minor modifications to existing EPON management presently available in OLTs. As described further below, embodiments enable such unified NMS using minor modifications/additions to existing OLT software and EPON management protocol and a simple conversion from EPON management to DOCSIS management at the CMC. Thus, standard DOCSIS CMs can be managed using a standard EPON OLT NMS.

Embodiments are described below with reference to an example HFC having mixed FTTH ONUs and coaxial connected CMs. As would be understood by a person of skill in the art, embodiments are not limited to the example network described herein. Further, embodiments are described using example implementations that enable the unified network management system at the OLT. These example implementations are provided for the purpose of illustration and are not limiting. Also, as understood by a person of skill in the art, embodiments can be applied to any PON or EoC technology, without limitation to EPON and DOCSIS described in the examples below.

Figure 13:
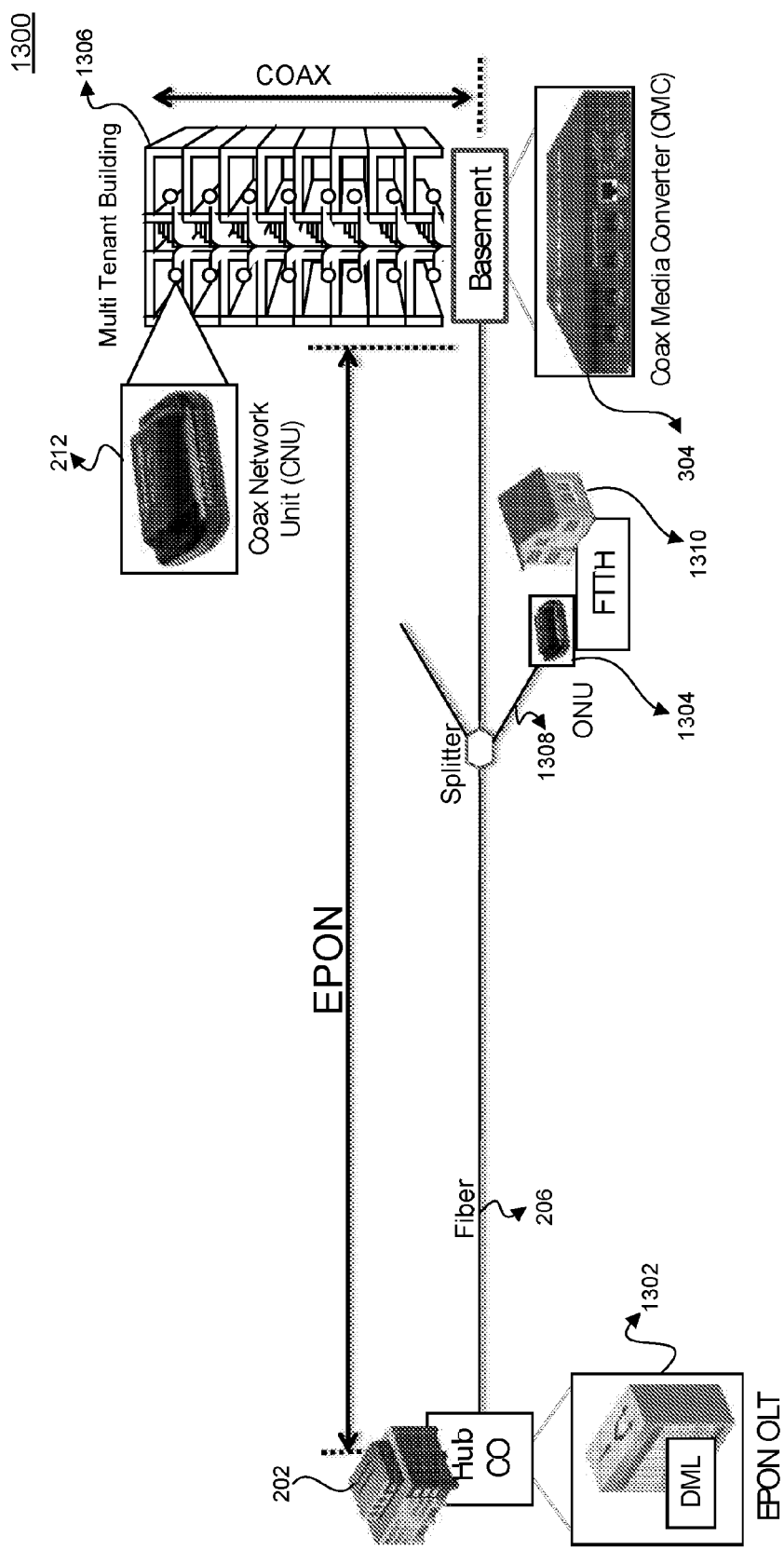
FIG. 13 illustrates an example network having mixed FTTH (fiber to the home) ONUs (Optical Network Units) and coaxial connected cable modems (CMs).

FIG. 13 illustrates an example network 1300 having mixed FTTH ONUs and coaxial connected CMs according to an embodiment of the present invention. Example network 1300 includes an OLT 1302 located in a CO/Hub 202, a CMC 304, an ONU 1304, and a plurality of CMs 212.

As shown in FIG. 13, CMC 304 sits, for example, in the basement of a multi-tenant building 1306. As such, the EPON side of the network extends as far as possible to the subscriber, with the coaxial side of the network only providing short coaxial connections between CMC 304 and CMs 212 located in individual apartments of multi-tenant building 1306. In an embodiment, CMs 212 are standard DOCSIS CMs.

ONU 1304 is coupled to OLT 1302 through an all-fiber link, comprised of fiber lines 206 and 1308. ONU 1304 enables FTTH service to a home 1310, allowing fiber optic line 1308 to reach the boundary of the living space of home 1310 (e.g., a box on the outside wall of home 1310).

According to embodiments, a network operator of example network 1300 can manage/service both FTTH ONU 1304 and CMs 212 using a unified network management system at OLT 1302. This includes end-to-end provisioning, management, and QoS with a single interface for both fiber and coaxial subscribers.

In an embodiment, OLT 1302 supports an EPON OLT network management system (NMS). The EPON OLT NMS employs a L2 OAM protocol (hereinafter referred to as "EPON OAM"), which is defined by the EPON operator. The EPON OAM protocol defines EPON OAM messages that can be used to manage and provision ONUs. In addition, the EPON OLT NMS has a host interface which allows the network operator to utilize the NMS to manage ONUs. The host interface offers the network operator a variety of host interface commands, which can be used to send particular EPON OAM messages to ONUs.

According to embodiments, the EPON OLT NMS is modified to enable an EPON OLT to manage CMs and ONUs using both the same host interface and the same EPON OAM protocol messages. Particularly, embodiments include modifications to the host interface of the EPON OLT NMS, and to the EPON OAM protocol used by the NMS to enable unified management for both ONUs and CMs. Example implementations of these modifications are provided below. As would be understood by a person of skill in the art based on the teachings herein, these modifications can be implemented in a variety of other ways, which are also within the scope of embodiments of the present invention.

Figure 14:
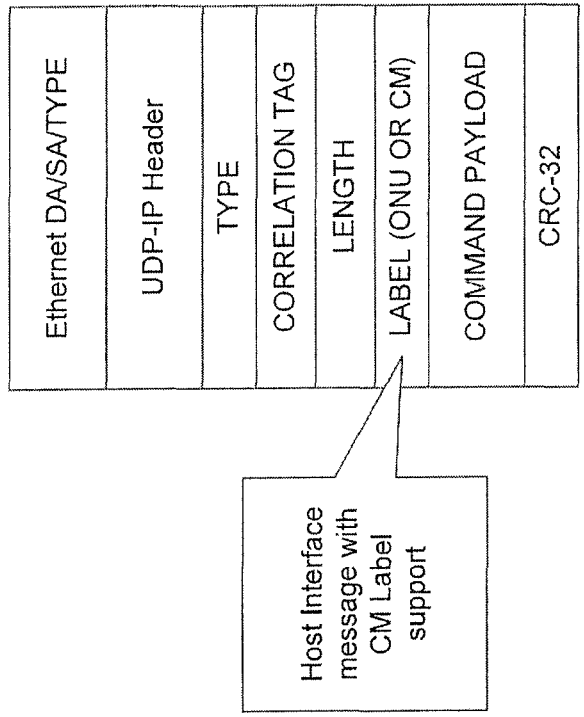
FIG. 14 illustrates an example modified host interface command according to an embodiment of the present invention.

FIG. 14 illustrates an example modified host interface command 1400 according to an embodiment of the present invention. In particular, as shown in FIG. 14, the host interface command is modified to add support for CM context. In an embodiment, this is done by adding a "Label" field which can be used to indicate whether the host interface command is for an ONU or a CM. If the host interface is for an ONU, the Label field is set to the ONU ID. If the host interface command is for a CM, the Label field is set to the CM ID. Note that because the CMC includes an ONU, it can be addressed using its ONU ID. As such, with this minor modification, the same host interface commands can be used for ONUs, the CMC, and CMs. Respective modification, as understood by a person of skill in the art based on the teachings herein, is also implemented in the OLT logic in order to add the CM context into host interface commands, as needed.

When a host interface command is intended for a CM (as determined by the CM Label), the resulting EPON OAM message (that is generated as a result of the host interface command) must indicate that the EPON OAM message is for that CM. Accordingly, in an embodiment, EPON OAM protocol messages are modified to include CM context support when the EPON OAM messages are intended for CMs.

Figure 15:
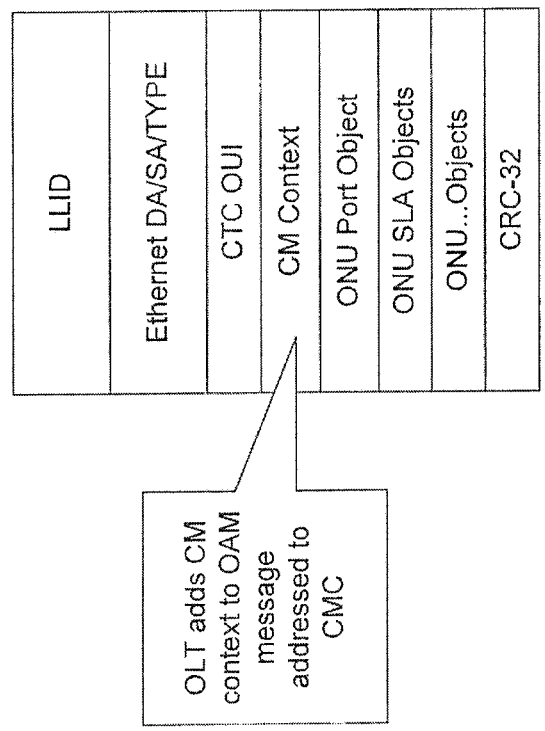
FIG. 15 illustrates an example modified OAM (Operations, Administration, and Maintenance) message according to an embodiment of the present invention.

FIG. 15 illustrates an example modified EPON OAM message 1500 according to an embodiment of the present invention. As shown in FIG. 15, the EPON OAM message is modified to add support for CM context, by adding a "CM Context" field inside the EPON OAM message. The CM Context field indicates the CM for which the EPON OAM message is intended. As such, with this minor modification, the EPON OAM protocol used by OLT 1302 to manage ONUs (such as ONU 1304) can be extended to also manage CMs (such as CMs 212). As would be understood by a person of skill in the art based on the teachings herein, respective modification is also implemented in the OLT logic to enable the addition of CM context to EPON OAM protocol messages, as needed.

The intended CM recipient of the EPON OAM message may or may not support EPON OAM. In the case that the CM supports EPON OAM, CMC 304 simply forwards the EPON OAM message to the CM without modification. In such case, the EPON OAM link (from OLT 1302) terminates at the CM itself. On the other hand, when the CM does not support EPON OAM (which is the case for standard DOCSIS CMs, for example), CMC 304 terminates the OAM link with OLT 1302, and translates the EPON OAM message to an OAM message (e.g., DOCSIS OAM message or SNMP command) that is supported by the CM. This is illustrated in FIG. 4, for example, which shows that CMC 304 can translate between an example 802.3ah (EPON) OAM protocol (which is a L2 OAM protocol) and a DOCSIS OAM protocol, and vice versa.

Thus, according to embodiments, when a modified EPON OAM message (which includes a CM Context field) is received by CMC 304, CMC 304 processes the CM Context field to determine the CM for which the EPON OAM message is intended. Then, CMC 304 determines whether or not a translation of the EPON OAM message to a DOCSIS OAM message is needed, before sending the OAM message to the intended CM recipient.

Accordingly, as described above, embodiments enable seamless and full management of both ONUs and CMs using the same EPON OLT NMS. This includes end-to-end provisioning, management, and QoS with a single interface for both ONUs and CM subscribers.

Figure 16:
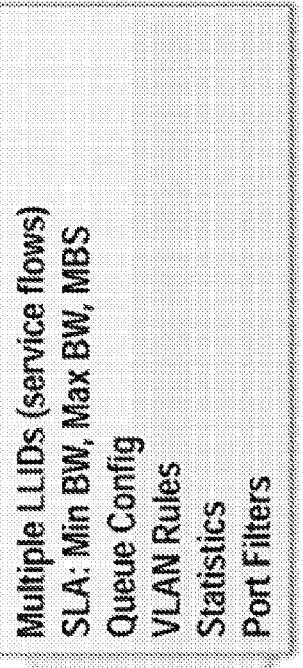
FIG. 16 illustrates an example view of a unified EPON OLT management interface according to an embodiment of the present invention.
Figure 16:
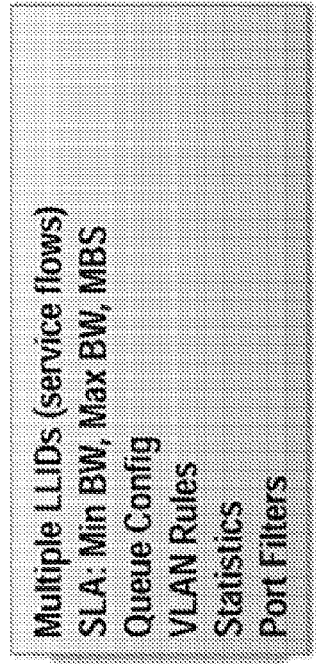

FIG. 16 illustrates an example view 1600 of a unified EPON OLT management interface according to an embodiment of the present invention. As shown in FIG. 16, the management interface shows a hierarchical view of the network being managed. The parent node of the hierarchy is the OLT 1602 where the NMS resides. Child nodes in the hierarchy include ONUs (such as ONU 1604) and CMCs (such as CMC 1606), and grandchild nodes in the hierarchy include CMs (such as CM 1608) served by CMCs. Any node in the network (whether OLT 1602, ONU 1604, CMC 1606, or 1608) can be managed by clicking on the respective listing of the node in the network hierarchy view. A node listing includes, for example, the node type (i.e., OLT, ONU, CMC, CM), a serial number of the node equipment, and an address associated with the node. The management interface provides the same end-to-end provisioning, management, and QoS functions for ONUs and CMs. For example, as shown in FIG. 16, the management interface enables the same LLID assignment functions, SLA settings, queue and port filter configuration, VLAN rules, and statistics for ONU 1604 and CM 1608.

Embodiments are not limited to the use of an EPON OLT NMS as described above. In fact, according to embodiments, the NMS at the OLT can be any NMS that the network operator desires to use. To enable this, embodiments provide an OLT mediation layer that translates from the used NMS to an EPON OLT NMS supported by CMC 304. CMC 304, as described above, may then translate back to the NMS protocol supported by the CMs. For example, according to embodiments, a network operator may use a DOCSIS NMS (SNMP) to manage an EPON-DOCSIS EoC network as described above. This is illustrated in FIG. 17, which shows an example network architecture 1700 according to an embodiment of the present invention.

Figure 17:
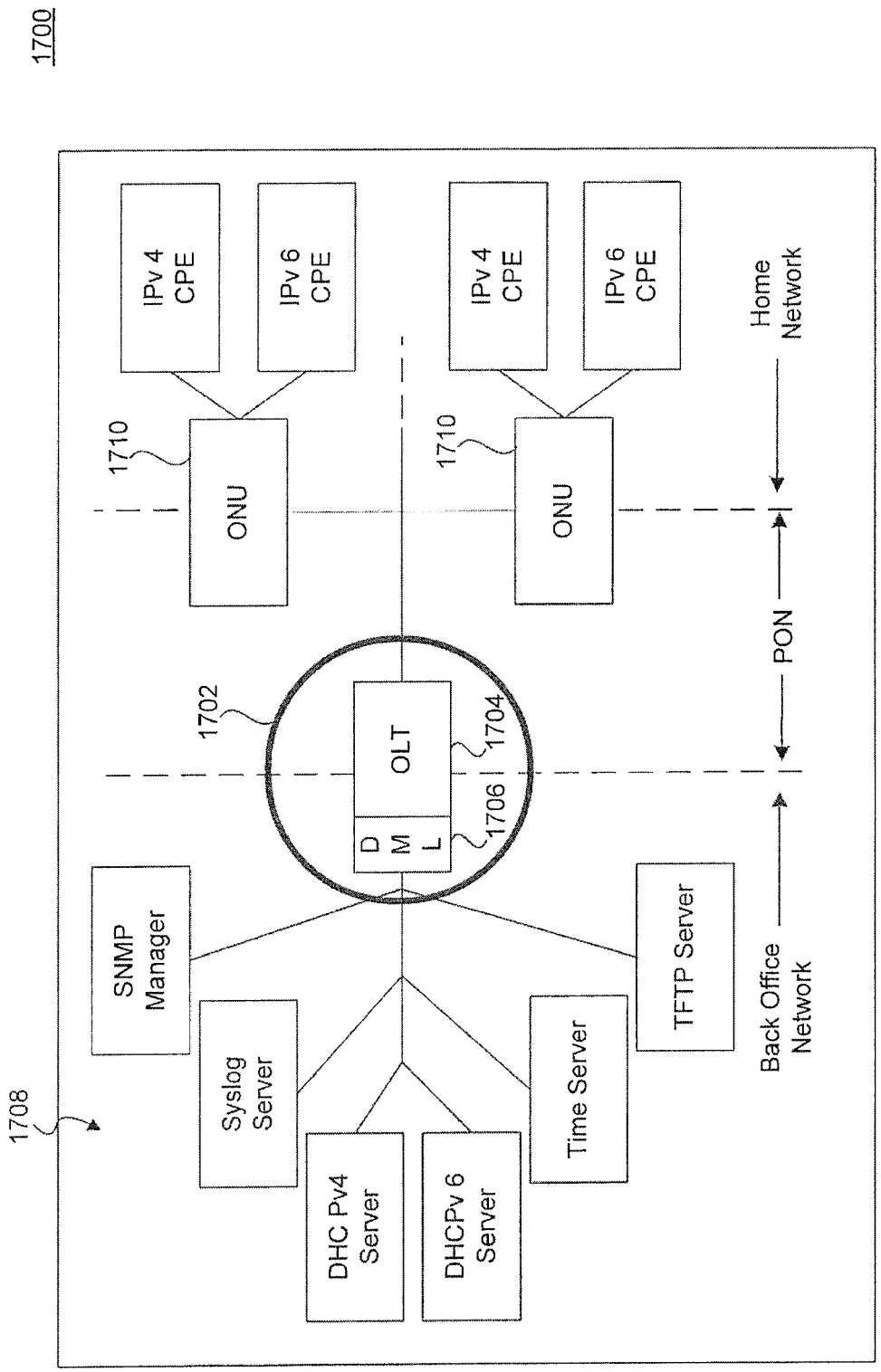
FIG. 17 illustrates an example network architecture according to an embodiment of the present invention.

As shown in FIG. 17, in example architecture 1700, OLT 1702 manages a plurality of ONUs 1710. In addition, OLT 1702 may manage a plurality of CMCs (not shown in FIG. 17) that serve a plurality of DOCSIS EoC connected CMs (not shown in FIG. 17). Thus, OLT 1702 manages an EPON-DOCSIS EoC network having mixed fiber connected ONUs (e.g., FTTH) and coaxial connected CMs.

OLT 1702 itself is managed by a DOCSIS NMS 1708. The DOCSIS NMS 1708 uses the same SNMP manager, Syslog server, TFTP server, etc. of a standard DOCSIS manager. Thus, NMS 1708 manages OLT 1702 in the same manner that it manages a CMTS. In fact, NMS 1708 need not be aware that it is managing an OLT or that the OLT is managing a network having mixed FTTH ONUs and coaxial CMs.

To enable this, in an embodiment, OLT 1702 is modified as shown in FIG. 17. In particular, OLT 1702 includes a standard EPON OLT 1704 and a DML (DOCSIS Mediation Layer) module 1706. As would be understood by a person of skill in the art, DML 1706 may be integrated within the standard logic of EPON OLT 1704 or provided as a separate interface between NMS 1708 and OLT 1704. DML 1706 may be implemented in hardware or software as understood by a person of skill in the art.

Thus, DML 1706 interfaces between DOCSIS NMS 1708 and EPON OLT 1704. In particular, DML 1706 translates from DOCSIS OAM to EPON OAM, and vice versa. Note that when an OAM message is destined to a CM, CMC 304 performs a second translation from EPON OAM to DOCSIS OAM, for example. In embodiments, DML 1706 may implement the same OAM translation functions implemented by CMC 304.

Accordingly, embodiments enable a network operator to use any (and a single) NMS that it desires to manage a network having mixed FTTH ONUs and coaxial connected CMs. For example, a cable company operator may wish to use a DOCSIS NMS (which the cable company already uses to manage its DOCSIS network) to manage such mixed network. Embodiments, as described, above allow the cable company operator to do so by a simple addition of a DML module between the NMS and the OLT. On the other hand, a telephone company operator (which is comfortable with using an EPON OLT NMS) can use an unmodified EPON OLT NMS with minor OLT/OAM protocol modifications to manage the same mixed network.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method for enabling unified management of fiber connected optical network units (ONUs) and coaxial connected cable modems (CMs) in a hybrid fiber coaxial (HFC) network, comprising:
   receiving, by an Optical Line Terminal (OLT), a management command from a network management system (NMS), the management command intended for a fiber connected ONU or a coaxial connected CM of the HFC, wherein the management command has a common format whether intended for the fiber connected ONU or the coaxial connected CM;
   generating, by the OLT, an Ethernet Passive Optical Network (EPON) Operations, Administration, and Maintenance (OAM) message based on the management command, wherein the EPON OAM message includes a CM context field when the message is intended for the coaxial connected CM; and
   sending the EPON OAM message to a coaxial media converter (CMC) that serves the coaxial connected CM when the management command is intended for the coaxial connected CM.

2. The method of claim 1, wherein the NMS is a non-EPON OLT NMS, the method further comprising:
   translating the management command from the NMS to an EPON OLT host interface command.

3. The method of claim 1, further comprising:
   converting the EPON OAM message to a Data Over Cable Service Interface Specification (DOCSIS) OAM message.

4. The method of claim 1, further comprising:
   sending the EPON OAM message directly to the fiber connected ONU when the management command is intended for the fiber connected ONU.

5. The method of claim 1, wherein the management command includes a label field that identifies whether the management command is intended for the coaxial connected CM or the fiber connected ONU.

6. The method of claim 5, further comprising adding a CM identification (ID) to the CM context field when the management command is intended for the coaxial connected CM.

7. The method of claim 1, wherein the EPON OAM message includes an ONU identifier (ID).

8. An Optical Line Terminal (OLT), comprising:
a network management system (NMS) configured to generate a management command, the management command intended for a fiber connected Optical Network Unit (ONU) or to a coaxial connected Cable Modem (CM), wherein the management command has a common format whether intended for the fiber connected ONU or the coaxial connected CM; and
an Ethernet Passive Optical Network (EPON) OLT module, coupled to the NMS, configured to:
generate an EPON Operations, Administration, and Maintenance (OAM) message based on the management command; and
send the EPON OAM message to a coaxial media converter (CMC) that serves the coaxial connected CM when the management command is intended for the coaxial connected CM.

9. The OLT of claim 8, wherein the EPON OAM message includes a CM context field when the management command is intended for the coaxial connected CM.

10. The OLT of claim 8, wherein the management command includes a label field that indicates whether the management command is intended for the coaxial connected CM or the fiber connected ONU.

11. The OLT of claim 10, wherein the label field includes a CM identifier (ID) of the coaxial connected CM to indicate that the management command is intended for the coaxial connected CM.

12. The OLT of claim 10, wherein the label field includes an ONU ID of the fiber connected ONU to indicate that the management command is intended for the fiber connected ONU.

13. The OLT of claim 9, wherein the CM context field indicates the coaxial connected CM for which the EPON OAM message is intended.

14. The OLT of claim 8, further comprising sending the EPON OAM message directly to the fiber connected ONU when the management command is intended for the fiber connected ONU.

15. A method for enabling, by an optical line transceiver (OLT), unified management of fiber connected optical network units (ONUs) and coaxial connected cable modems (CMs) in a hybrid fiber coaxial (HFC) network, comprising:
receiving a first Ethernet frame from a network;
associating a first Virtual Local Area Network (VLAN) tag with the first Ethernet frame that identifies a first cable modem to which the first Ethernet frame is destined and a class of service (CoS) for the first Ethernet frame;
receiving a second Ethernet frame from a second cable modem and an associated second VLAN tag, the second VLAN tag identifying the second cable modem from which the second Ethernet frame originated and the CoS for the second Ethernet frame.

16. The method of claim 15, wherein the associating includes inserting the first VLAN tag inside the first Ethernet frame.

17. The method of claim 16, wherein the first VLAN tag is inserted before a EtherType/Size field of the first Ethernet frame.

18. The method of claim 17, wherein the associating includes attaching the first VLAN tag to the beginning of the first Ethernet frame.

19. The method of claim 15, further comprising:
updating a table of known CMs based on the received second VLAN tag associated with the second Ethernet frame; and
generating the first VLAN tag based on the table of known CMs.

20. The method of claim 19, wherein the updating includes:
determining that a source MAC address associated with the second Ethernet frame is not included within the table of known CMs;
extracting a CM index from the second VLAN tag; and
storing, in the table of known CMs, the CM index in associating with the source MAC address.

* * * * *